US008824802B2

(12) United States Patent
Kutliroff et al.

(10) Patent No.: US 8,824,802 B2
(45) Date of Patent: ***Sep. 2, 2014

(54) METHOD AND SYSTEM FOR GESTURE RECOGNITION

(75) Inventors: Gershom Kutliroff, Alon Shrut (IL); Amit Bleiweiss, Bet Shemesh (IL); Eran Eilat, Bet Shemesh (IL)

(73) Assignee: Intel Corporation, Santa Clara, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/707,340

(22) Filed: Feb. 17, 2010

(65) Prior Publication Data

US 2010/0208038 A1    Aug. 19, 2010

Related U.S. Application Data

(60) Provisional application No. 61/153,229, filed on Feb. 17, 2009.

(51) Int. Cl.
    *G06K 9/46* (2006.01)
    *G06K 9/00* (2006.01)
(52) U.S. Cl.
    CPC .................. *G06K 9/00335* (2013.01)
    USPC ............. 382/190; 348/46; 348/143; 348/153; 348/154
(58) Field of Classification Search
    CPC ................................. G06K 9/00335
    USPC ........................... 348/46, 153, 154
    See application file for complete search history.

(56) References Cited

U.S. PATENT DOCUMENTS

| 4,900,033 | A | 2/1990 | Campos et al. |
| 5,534,917 | A | 7/1996 | MacDougall et al. |
| 6,072,494 | A | 6/2000 | Nguyen |
| 6,181,343 | B1 | 1/2001 | Lyons |
| 6,256,033 | B1 * | 7/2001 | Nguyen ........................ 715/863 |
| 6,270,414 | B2 | 8/2001 | Roelofs |
| 6,336,891 | B1 | 1/2002 | Fedrigon et al. |
| 6,632,158 | B1 | 10/2003 | Nashner |

(Continued)

FOREIGN PATENT DOCUMENTS

| JP | 2007316882 | 12/2007 |
| KR | 1020060070280 | 6/2006 |

(Continued)

OTHER PUBLICATIONS

Co-pending U.S. Appl. No. 12/817,102, filed Jun. 16, 2010.
Co-pending U.S. Appl. No. 11/866,280, filed Oct. 2, 2007.
Co-pending U.S. Appl. No. 12/392,879, filed Feb. 25, 2009.
C. Keskin, et al., Real Time Hand Tracking and 3D Gesture Recognition for Interactive Interfaces Using HMM, Computer Engineering Dept. Bogazici University, pp. 1-4.
International Search Report PCT/US2010/023179 dated Sep. 16, 2010, pp. 1-3.

(Continued)

*Primary Examiner* — Glenford Madamba
(74) *Attorney, Agent, or Firm* — Blakely, Sokoloff, Taylor & Zafman LLP

(57) ABSTRACT

A method of image acquisition and data pre-processing includes obtaining from a sensor an image of a subject making a movement. The sensor may be a depth camera. The method also includes selecting a plurality of features of interest from the image, sampling a plurality of depth values corresponding to the plurality of features of interest, projecting the plurality of features of interest onto a model utilizing the plurality of depth values, and constraining the projecting of the plurality of features of interest onto the model utilizing a constraint system. The constraint system may comprise an inverse kinematics solver.

14 Claims, 10 Drawing Sheets

(56) References Cited

U.S. PATENT DOCUMENTS

| | | | |
|---|---|---|---|
| 6,788,809 | B1 | 9/2004 | Grzeszczuk et al. |
| 6,941,239 | B2 | 9/2005 | Unuma et al. |
| 7,038,855 | B2 | 5/2006 | French et al. |
| 7,340,077 | B2 | 3/2008 | Gokturk et al. |
| 7,369,685 | B2 | 5/2008 | DeLean |
| 7,372,977 | B2 | 5/2008 | Fujimura et al. |
| 7,379,563 | B2 | 5/2008 | Shamaie |
| 7,421,369 | B2 | 9/2008 | Clarkson |
| 7,725,547 | B2 | 5/2010 | Albertson et al. |
| 7,753,861 | B1 | 7/2010 | Kahn et al. |
| 7,781,666 | B2 | 8/2010 | Nishitani et al. |
| 7,789,800 | B1 | 9/2010 | Watterson et al. |
| 7,840,031 | B2 | 11/2010 | Albertson et al. |
| 7,843,425 | B2 | 11/2010 | Lu et al. |
| 7,970,176 | B2 | 6/2011 | Kutliroff et al. |
| 7,971,156 | B2 * | 6/2011 | Albertson et al. ............ 715/863 |
| 8,094,928 | B2 | 1/2012 | Graepel et al. |
| 8,113,991 | B2 | 2/2012 | Kutliroff |
| 2001/0016510 | A1 | 8/2001 | Ishikawa et al. |
| 2003/0078138 | A1 | 4/2003 | Toyama |
| 2003/0134714 | A1 | 7/2003 | Oishi et al. |
| 2003/0156756 | A1 | 8/2003 | Gokturk et al. |
| 2004/0001113 | A1 | 1/2004 | Zipperer et al. |
| 2005/0227811 | A1 | 10/2005 | Shum et al. |
| 2005/0271279 | A1 | 12/2005 | Fujimura et al. |
| 2006/0018516 | A1 | 1/2006 | Masoud et al. |
| 2006/0202953 | A1 | 9/2006 | Pryor et al. |
| 2007/0110298 | A1 * | 5/2007 | Graepel et al. ................ 382/154 |
| 2007/0298883 | A1 | 12/2007 | Feldman et al. |
| 2008/0139307 | A1 | 6/2008 | Ueshima et al. |
| 2008/0152191 | A1 | 6/2008 | Fujimura et al. |
| 2008/0192005 | A1 * | 8/2008 | Elgoyhen et al. ............ 345/158 |
| 2008/0225041 | A1 | 9/2008 | El Dokor et al. |
| 2008/0244465 | A1 | 10/2008 | Kongqiao et al. |
| 2008/0258921 | A1 | 10/2008 | Woo et al. |
| 2009/0023555 | A1 | 1/2009 | Raymond |
| 2009/0048070 | A1 | 2/2009 | Vincent et al. |
| 2009/0085864 | A1 | 4/2009 | Kutliroff et al. |
| 2009/0113389 | A1 | 4/2009 | Ergo et al. |
| 2009/0175540 | A1 * | 7/2009 | Dariush et al. ................ 382/195 |
| 2009/0232353 | A1 | 9/2009 | Sundaresan et al. |
| 2009/0234614 | A1 | 9/2009 | Kahn et al. |
| 2009/0262986 | A1 | 10/2009 | Cartey et al. |
| 2009/0298650 | A1 | 12/2009 | Kutliroff |
| 2010/0034457 | A1 | 2/2010 | Berliner et al. |
| 2010/0066676 | A1 | 3/2010 | Kramer et al. |
| 2010/0103093 | A1 | 4/2010 | Izumi |
| 2010/0111370 | A1 * | 5/2010 | Black et al. .................... 382/111 |
| 2010/0306699 | A1 | 12/2010 | Hsu et al. |
| 2011/0090407 | A1 | 4/2011 | Friedman |
| 2011/0249107 | A1 | 10/2011 | Chiu |

FOREIGN PATENT DOCUMENTS

| | | |
|---|---|---|
| WO | WO-9919788 A1 | 4/1999 |
| WO | WO-2005114556 A2 | 12/2005 |
| WO | WO-2011036618 A2 | 3/2011 |

OTHER PUBLICATIONS

Jakub Segen, et al., Fast and Accurate 3D Gesture Recognition Interface, Bell Laboratories, Holmdel, NJ 07733, 6 pages.

Vladimir I. Pavlovic, et al., Visual Interpretation of Hand Gestures for Human-Computer Interaction: A Review, Department of Electrical and Computer Engineering, and The Beckman Institute for Advanced Science and Technology University of Illinois at Urbana-Champaign, 36 pages.

Written Opinion PCT/US2010/023179 dated Sep. 16, 2010, pp. 1-4.

Y. Zhu, B., Dariush, K., Fujimura, "Controlled Human Pose Estimation from Dept H Image Streams" IEEE Computer Society Conference on Computer Vision and Pattern Recognition Workshops (CVPRW 08), pp. 1-8, Jun. 23-28, 2008. See abstract: Sections 2, 3, and 5: figure 1.

Alon, J., et al., "Accurate and Efficient Gesture Spotting via Pruning and Subgesture Reasoning", Computer Vision in Human-Computer Interaction Lecture Notes in Computer Science, LNCS, Springer, Berlin, DE, pp. 189-198, Jan. 1, 2005.

Fujiki R., Anita D., and Taniguchi, R.: Real-time 3D hand shape estimation based on inverse kinematics and physical constraints. Proc ICIAP Springer LNCS 2005, Fabio Rolio and Sergio Vitulano (Eds.). 3617:850-858, 2005.

Hansen, D., et al., "In the Eye of the Beholder: A Survey of Models for Eyes and Gaze," IEEE Transactions on Pattern Analysis and Machine Intelligence, vol. 32, Issue 3, pp. 478-500, Mar. 2010.

Lewis, J.P., et al., "Pose space deformations: A unified approach to shape interpolation and skeleton-driven deformation", Annual Conference Series, ACM SIGGRAPH, pp. 165-172, 2000.

Mackie, J., et al., "Finger Detection with Decision Trees, 2004. Proceedings of Image and Vision Computing New Zealand", pp. 399-403, 2004.

Oikonomidis, I., et al., "Efficient Model-Based 3D Tracking of Hand Articulations using Kinect", 22nd British Machine Vision Conference, pp. 1-11, Aug. 29-Sep. 2, 2011.

Portillo-Rodriguez, O., et al., "Development of a 3D real time gesture recognition methodology for virtual environment control", Robot and Human Interactive Communication, 2008 Ro-Man 2008, The 17th IEEE International Symposium On, IEEE, Piscataway, N.J., U.S.A. pp. 279-284, Aug. 1, 2008.

Extended Search Report with Supplementary Search Report and Search Opinion Mailed Jun. 18, 2013, for European Patent Application No. EP 10744130 filed Feb. 4, 2010.

International Search Report and Written Opinion mailed Feb. 28, 2013, for International Application No. PCT/US2012/047364, filed Jul. 19, 2012, 11 pages.

Co-pending U.S. Appl. No. 13/310,510 by Kutliroff, G., et al., filed Dec. 2, 2011.

Co-pending U.S. Appl. No. 13/441,271 by Bleiweiss, A., et al., filed Apr. 6, 2012.

Co-pending U.S. Appl. No. 13/532,609 by Kutliroff, G., et al., filed Jun. 25, 2012.

Co-pending U.S. Appl. No. 13/552,978 by Yanai, Y., filed Jul. 19, 2012.

Co-pending U.S. Appl. No. 13/563,516 by Kutliroff, G., et al., filed Jul. 31, 2012.

Co-pending U.S. Appl. No. 13/652,181 by Yanai, Y., et al., filed Oct. 15, 2012.

Co-pending U.S. Appl. No. 13/676,017 by Kutliroff, G., et al., filed Nov. 13, 2012.

Co-pending U.S. Appl. No. 13/768,835 Fleischmann, S., et al., filed Feb. 15, 2013.

Co-pending U.S. Appl. No. 13/785,669 by Kutliroff, G., et al., filed Mar. 5, 2013.

Co-pending U.S. Appl. No. 13/857,009 Fleischmann, S., et al., filed Apr. 4, 2013.

Notice of Allowance Mailed Mar. 15, 2011, in Co-Pending U.S. Appl. No. 11/866,280 by Kutliroff, G., et al., filed Oct. 2, 2007.

Restriction Requirement Mailed Aug. 31, 2010, in Co-pending U.S. Appl. No. 12/392,879 by Kutliroff, G., filed Feb. 25, 2009.

Non-Final Office Action Mailed Dec. 22, 2010, in Co-pending U.S. Appl. No. 12/392,879 by Kutliroff, G., filed Feb. 25, 2009.

Final Office Action Mailed Jun. 10, 2011, in Co-pending U.S. Appl. No. 12/392,879 by Kutliroff, G., filed Feb. 25, 2009.

Notice of Allowance Mailed Oct. 21, 2011, in Co-pending U.S. Appl. No. 12/392,879 by Kutliroff, G., filed Feb. 25, 2009.

Restriction Requirement mailed Nov. 30, 2012, in Co-pending U.S. Appl. No. 12/817,102 by Kutliroff, G., et al., filed Jun. 16, 2010.

Non-Final Office Action mailed Jan. 29, 2013, in Co-pending U.S. Appl. No. 12/817,102 by Kutliroff, G., et al., filed Jun. 16, 2010.

Notice of Allowance mailed Jul. 29, 2013, in Co-pending U.S. Appl. No. 12/817,102 by Kutliroff, G., et al., filed Jun. 16, 2010.

* cited by examiner

METHOD AND SYSTEM FOR GESTURE RECOGNITION

CROSS-REFERENCE TO RELATED APPLICATIONS

This application claims the benefit of U.S. Provisional Application No. 61/153,229, entitled "METHOD AND SYSTEM FOR GESTURE RECOGNITION", filed Feb. 17, 2009, and is hereby incorporated by reference in its entirety.

BACKGROUND INFORMATION

There are many techniques for interpreting the movements of a player or user of a computer system so that the player or user can communicate with the computer system through a natural and intuitive interface. There has been much recent interest in the application of these interfaces to the home entertainment and gaming market. Notable among these are, for example, Nintendo Wii's controllers and the Wii Fit's Balance Board. The Nintendo controllers rely on accelerometers and also calculate the position of a controller by triangulation. Alternatively, many human-machine interface techniques rely on different types of cameras. An early example of a camera-based interface system is Sony's Eyetoy system, which uses a conventional color camera to detect rough movements and classify them as user-performed gestures.

In the context of a computer video game, there are several important considerations to take into account when designing the gesture recognition system, and their relative importance depends on how the gesture recognition system is used within the game. One use of the gesture recognition system is to allow for user feedback, as, once a particular gesture is recognized, pre-recorded animation sequences can be played to show the user what the system understands he did. A second use of the gesture recognition system is for scoring, as a gameplay mechanism, e.g., to add to the score, and to allow the player to advance to different levels. Thus, the way in which the gesture recognition system is used in the game places different constraints on the design of the system. As one example, if the system is used to provide the user with feedback as to the movements he performed, it is important to minimize the delay between the user's performance of the gesture and the system's recognition of same gesture. The sensitivity to the system delay is not as important if the gesture recognition system is being used in order to compute the player's score.

U.S. Pat. No. 7,340,077 describes a gesture recognition system that obtains position information indicating depth for a plurality of discrete regions on a body part of a person and then classifies the gesture using this information. According to the patent, there is an explicit start time which designates when to begin storing the discrete regions and also an explicit end time, which indicates that the user has completed the gesture. After explicitly identifying the start and end times, the comparison to the gesture library is performed. Consequently, an inherent lag is introduced by this method. In addition, the data collection is done directly on the depth data. That is, data points can only be sampled from depth data corresponding to "1" values on the binary mask. There are some limitations that result from the sampling of the data points from the depth data. Firstly, the depth data itself is typically noisy, and this can deleteriously affect the quality of the sampled values. Secondly, this method of sampling data points from the depth data is necessarily restricted to the field of view of the camera.

Summary The present invention relates to recognizing the gestures and movements performed by players in front of depth cameras, and, in one embodiment, the use of these gestures in order to drive gameplay in a computer video game. The following summary of the invention begins with several terms defined below.

Gesture Recognition System. A gesture recognition system is a system that recognizes and identifies pre-determined movements performed by a user in front of an input device, for example. Examples include interpreting data from a camera to recognize that a user has closed his hand, or interpreting the data to recognize a forward punch with the left hand.

Depth Sensors. The present invention may perform gesture recognition using data from depth sensors, which may be cameras that generate 3D data. There are several different types of depth sensors. Among these are cameras that rely on the time-of-flight principle, or on structured light technology, as well as stereoscopic cameras. These cameras may generate an image with a fixed resolution of pixels, where each pixel has an integer value, and these values correspond to the distance of the object projected onto that region of the image by the camera. In addition to this depth data, the depth cameras may also generate color data, in the same way that conventional color cameras do, and this data can be combined with the depth data for use in processing. Multiple frames of image depth data can be acquired by the camera.

Binary Mask. Using the depth data, it is also trivial to create a binary mask, which is an image of the same resolution as the original image, but all pixels have integer values corresponding to either 0 or 1. Typically, all pixels have a threshold and receive a value of 0 in the binary mask if the pixel value is below the threshold, and 1 if the pixel value is above the threshold. For example, in the case of a player standing in front of the depth camera, the binary mask is generated (and thus the threshold computed) so that pixels corresponding to the player's body are 1, and all other pixels are 0. Effectively then, the binary mask is the silhouette of the user, as captured by the camera.

Articulated Figure. An articulated figure is a collection of joints connected to each other in some fixed way and constrained to move in certain ways, e.g., a human skeleton.

Inverse Kinematics Solver. An Inverse Kinematics (IK) Solver may be used in the present invention. Given a desired configuration of an articulated figure (e.g. the positions of certain joints) the Inverse Kinematics Solver computes the angles between the given joints and other joints in the figure that yield the given locations of the selected joints. For example, given the locations of the wrist and shoulder, an IK Solver can compute the angles of the shoulder and elbow joints that yield these wrist and shoulder locations, thereby also effectively computing the location of the elbow joint.

U.S. patent application Ser. No. 11/866,280, entitled "METHOD AND SYSTEM FOR GESTURE CLASSIFICATION", describes a method and system for using gesture recognition to drive gameplay in games and is incorporated by reference in its entirety. Such a method and system may be utilized by the present invention, as described below. In one embodiment, the method described in U.S. patent application Ser. No. 11/866,280 is applicable to data generated from the IK Solver model.

Within a certain margin of error, the parts of the body can be identified from the data produced by a depth camera. After the positions of the various parts of the body are identified on the depth image, the depth values can be sampled from the image, so that the three-dimensional (3D) positions of each body part are obtained. (This step is referred to as the tracking module.) A gesture recognition system can then be trained and implemented on these 3D positions corresponding to the points on the user's body.

In the current invention, the 3D positions corresponding to the parts of the body may be mapped onto a model. In one embodiment, an Inverse Kinematics (IK) Solver is used to project the data points obtained from the depth image onto the possible configurations human joints can take. The IK Solver model essentially acts as a constraint, and the data is filtered so that it fits within the framework of the model of natural human movement.

There are several important advantages in using an IK Solver to filter the data from the tracking module. First, the IK Solver model effectively smoothes the data, thereby minimizing the effects of camera noise. Second, the data points obtained from the tracking module necessarily correspond to pixels of value "1" on the binary mask (that is, they fall on the silhouette of the user). There is no such restriction pertaining to the data obtained by the IK Solver. To give a specific example, the player may be standing close to the edge of the camera's field of view. In this case, when he reaches out to the side, the end of his arm will be out of the field of view of the camera. In spite of this, the IK Solver module should compute that the player's arm is reaching out of the field of view and return the location of his hand. Obviously, there is no way to do this using only the data from the tracking module. A third advantage in using the IK Solver model is in dealing with occlusions. For example, often, the player's hand will occlude the camera's view of his elbow. Consequently, no data corresponding to the elbow can be sampled from the depth image (since its location is unknown). Given the locations of the hand and shoulder, however, the IK Solver model is able to calculate the approximate position of the elbow as well.

An additional component of this invention is the gesture classification method. The method described in U.S. patent application Ser. No. 11/866,280 is a binary classifier as to whether a gesture has been performed or not. That is, the method yields a binary, "yes" or "no" indication as to whether the gesture was performed or not. A characteristic of the method described in U.S. patent application Ser. No. 11/866,280 is that it must wait until the gesture is completed before deciding whether any of the gestures in the gesture library were performed. An alternative way to classify gestures is included in the present invention. Rather than deciding binary ("yes" or "no") if the gesture was performed or not, the method described in the present invention tracks a gesture being performed frame by frame, and indicates after every frame how close the gesture being performed is to a given gesture in the gesture library.

BRIEF DESCRIPTION OF THE DRAWINGS

Examples of a gesture recognition system and method are illustrated in the figures. The examples and figures are illustrative rather than limiting.

DETAILED DESCRIPTION

Figure 1:
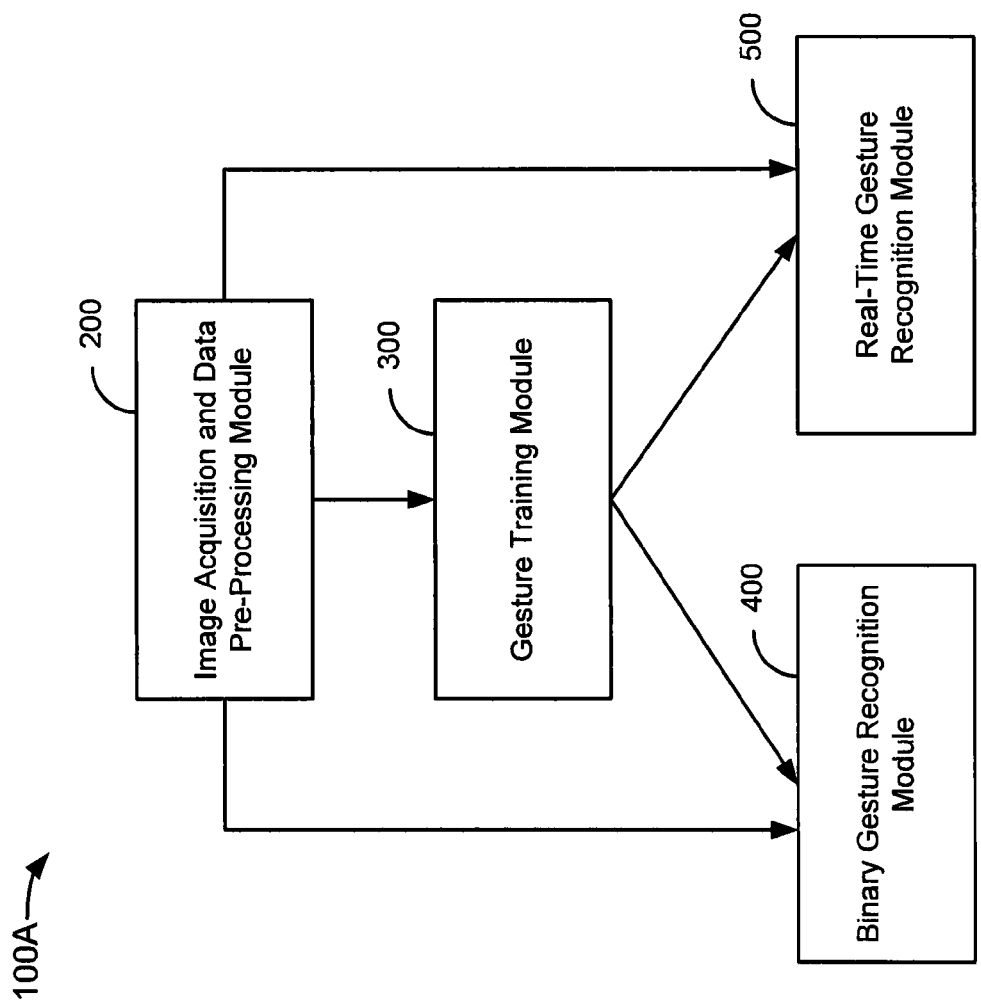
FIG. 1 illustrates a block diagram 100A of the overall architecture of one embodiment of the gesture recognition system

FIG. 1 illustrates a block diagram 100A of the overall architecture of one embodiment of the gesture recognition system. Image Acquisition & Data Pre-Processing Module 200 obtains multiple frames of the image depth data from the camera and processes it before feeding the processed data to three other modules, the Gesture Training Module 300, the Binary Gesture Recognition Module 400, and the Real-Time Gesture Recognition Module 500. In one embodiment, Gesture Training Module 300 trains the gesture recognition algorithms by computing the most efficient way to characterize particular gestures from the data fed into the module. In one embodiment, Gesture Training Module 300 is run as an offline task. The characterization of the gestures from the data that is generated by Gesture Training Module 300 is sent to Binary Gesture Recognition Module 400 and Real-Time Gesture Recognition Module 500. In addition, the data from Image Acquisition & Data Pre-Processing Module 200 is also sent to Binary Gesture Recognition Module 400 and Real-Time Gesture Recognition Module 500.

Figure 2:
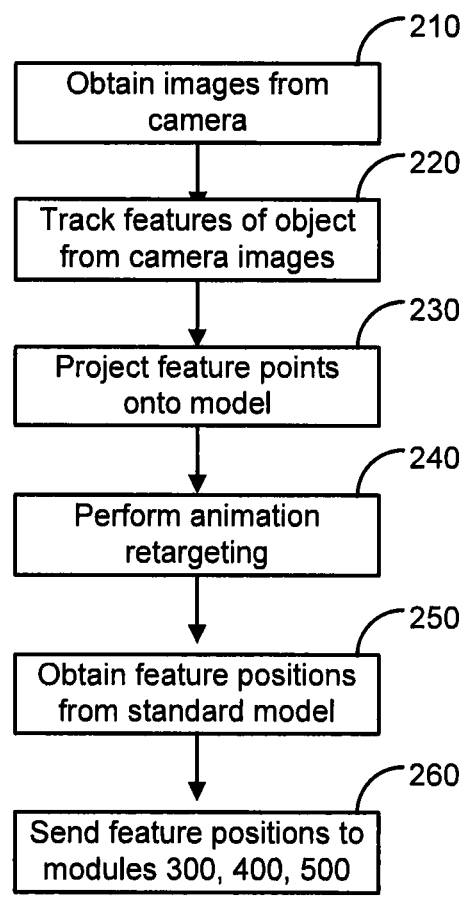
FIG. 2 depicts a flow diagram illustrating an exemplary process 200A for obtaining data from the camera and processing the data to obtain feature positions, according to an embodiment of the disclosure.

FIG. 2 depicts a flow diagram illustrating an exemplary process 200A for obtaining image data from the camera and processing the data to obtain feature positions, according to an embodiment of the disclosure. The Image Acquisition & Data Pre-Processing Module 200 of the system performs process 200A. In one embodiment, the feature positions are the joint positions. The obtained feature positions are sent to the Modules 300, 400, and 500.

At block 210, module 200 obtains two-dimensional image data from the camera. This data can be either depth data alone or depth data and color data.

At block 220, module 200 processes the data from the camera. This may be only the depth image, or it could be the depth image in conjunction with color images. Image processing algorithms are used to identify, as accurately as possible, the points on the two-dimensional (2D) images obtained from the camera corresponding to the various features of the object being tracked. If a player's body is being tracked, these features may include the player's head, right and left shoulder joints, right and left elbow joints, right and left hands, torso, pelvis, right and left knee joints. After the locations of the features of interest are identified on the 2D images, the depth values can be sampled from the depth image, to obtain three-dimensional (3D) positions of each feature. In one embodiment, this corresponds to obtaining 3D positions (including depth from the depth image) of each of the joints of interest.

At block 230, the 3D positions of the joints obtained at block 220 are projected onto a model of the object being tracked. There are several different types of models upon which the data can be mapped. In one embodiment, the model may be a geometric shape. For example, the model could be a simple geometric representation of a human hand, with a palm and five fingers. In one embodiment, the model is a representation of the human skeleton, which is constrained to manifest only configurations that are consistent with natural human movements, through the use of an Inverse Kinematics (IK) Solver, or another constraint system. In one embodiment, the IK Solver solves a system of equations that model the possible configurations of the joints of the human skeleton and effectively acts as a constraint to each joint's freedom of movement.

Constraining the joint positions obtained at block 220 to the model at block 230 serves several important functions. First, it filters noise from the camera and effectively smoothes the results. Second, certain of the player's limbs may be out of the field of view of the camera. In this case, the model of block 230 is able to calculate the approximate locations of joints that are not in the camera's view. Third, it fills in the positions of joints that can not be obtained from the camera's data. An IK Solver is able to compute the locations of some joints given those of other "adjacent" joints. For example, if the player's hand is stretched outward directly towards the camera, his elbow and possibly shoulder are likely occluded from view. In this case, it is not possible to obtain the 3D positions of these joints at block 220. At block 230, however, the 3D positions of these joints are obtained from the model of the human skeleton, which is able to calculate the positions of some joints, given the locations of other joints.

Some embodiments include an optional block 240, wherein the location data of the features (or joints) is scaled to a standard skeleton, or standard model. This is commonly called "animation retargeting." This block is useful, although not required, because the training data and testing data must reference the same coordinate system, even though typically the training data is collected from users with different body proportions than those on whom the testing data is collected. In order to better apply the trained gestures to users' bodies that were not included in the training data, the tracking data may be appropriately scaled.

At block 250, the data is collected from the standard model used for animation retargeting. In one embodiment, this corresponds to obtaining the 3D positions of the joints from the skeleton model. At block 260, the data retrieved from the model is sent to Gesture Training Module 300 for training gesture classification algorithms, as well as the Gesture Recognition Modules 400 and 500.

Figure 3A:
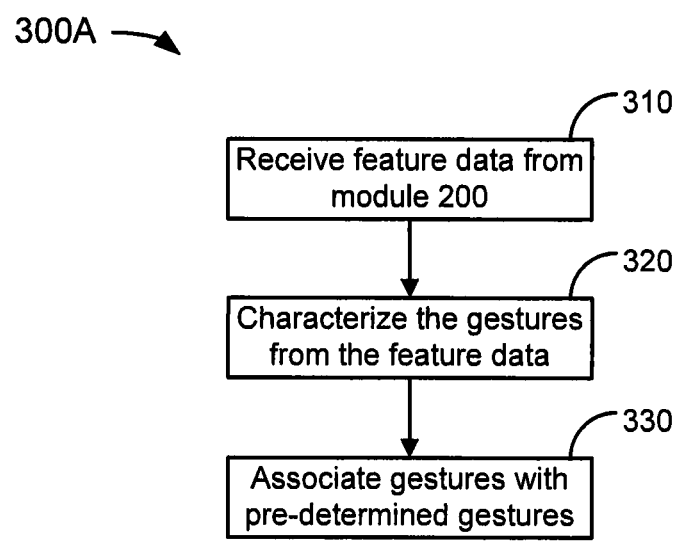
FIG. 3A depicts a flow diagram illustrating an exemplary process 300A for constructing a gesture library, according to an embodiment of the disclosure.

FIG. 3A depicts a flow diagram illustrating an exemplary process 300A for constructing a gesture library. The Gesture Training Module 300 of the system performs process 300A. At block 310, module 300 receives feature data generated by Image Acquisition & Data Pre-Processing Module 200. Then at block 320, module 300 characterizes the gestures from the feature data. And at block 330, module 300 associates the gestures with particular pre-determined gestures, according to an embodiment of the disclosure. As the output of process 300A, at block 330 a gesture library is constructed, in which each gesture has a particular characterization in terms of the data generated by Image Acquisition & Data Pre-Processing Module 200.

Figure 3B:
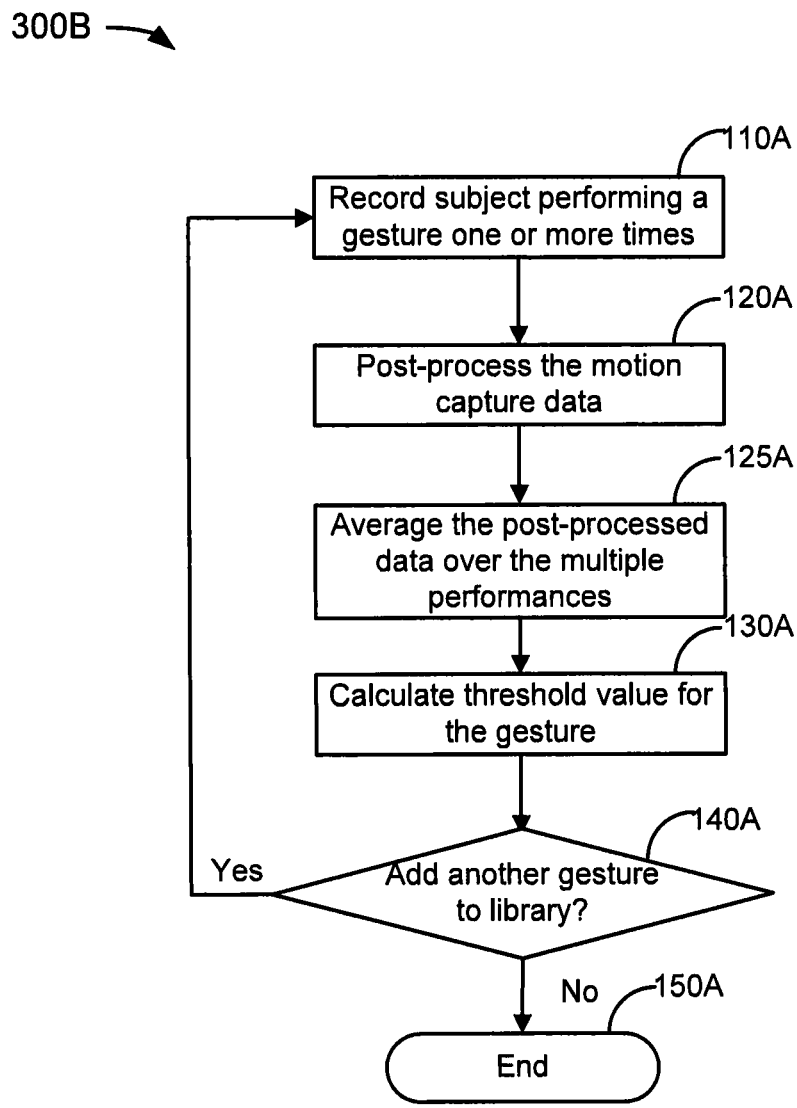
FIG. 3B depicts a flow chart illustrating an exemplary process 300B of creating a library of gestures using motion capture equipment, according to an embodiment of the disclosure.

Blocks 320 and 330 of FIG. 3A may contain the blocks FIG. 3B, described in more detail below and found at FIG. 1 from U.S. patent application Ser. No. 11/866,280. Alternatively, block 310 of FIG. 3A may contain the blocks of FIG. 3C described in more detail below and also found at FIG. 2 from U.S. patent application Ser. No. 11/866,280. In one embodiment, blocks 320 and 330 are performed as an offline task.

In order to classify a user's movements as a particular gesture, the user's movements are compared to a known set of gestures catalogued and stored in a gesture library. For each gesture in the library, baseline or "ground truth" data is first generated in a pre-processing step for each gesture. The "ground truth" data is then used as a baseline against which a user's movements are compared in order to classify the movements as a particular gesture. Data characterizing the relative positions of the feature points of interest over several images in a sequence are used for the comparison. FIG. 3B shows one method 300B by which "ground truth" data may be obtained for the gesture library.

In step 110A, at least one subject is recorded performing a gesture of interest multiple times. A sensor is placed on each feature point of interest on the subject's body, and motion capture equipment is used to record the subject's movements in a sequence of images. Feature points of interest may include joints and locations corresponding to, for example, the subject's left hand, left elbow, left shoulder, or head. It will be apparent to a person skilled in the art that many other locations on a subject's body may also be feature points of interest. The output of step 110A is a set of three-dimensional points with each point corresponding to one feature point in each image in the sequence.

In step 120A, the data from the motion capture sessions are post-processed by manually cleaning and smoothing the data using standard techniques for processing motion capture data. It will be apparent to a person skilled in the art that other post-processing steps may also be performed. The data is then averaged in step 125A over the multiple times that the gesture is performed in order to minimize bias. In a preferred embodiment, many different subjects are recorded performing the gesture, and the gestures of the different subjects are averaged to prevent overfitting the ground truth data to one person.

A similarity measure is a function that quantitatively compares the similarity of two gesture sets with each other. The higher the similarity measure value, the more similar a person's movements are to a known gesture that the movements are being compared to. In step 130A, a threshold value is calculated for the gesture such that if a similarity measure comparing the gesture to a person's movements is greater than a threshold value for that particular gesture, it is likely that the person's movements have been identified as that gesture.

Step 140A queries whether another gesture is to be added to the gesture library. If so, the above steps are repeated beginning at step 110A with the recording of at least one subject performing the new gesture. If no further gestures are to be added to the library, then the gesture library is complete.

Figure 3C:
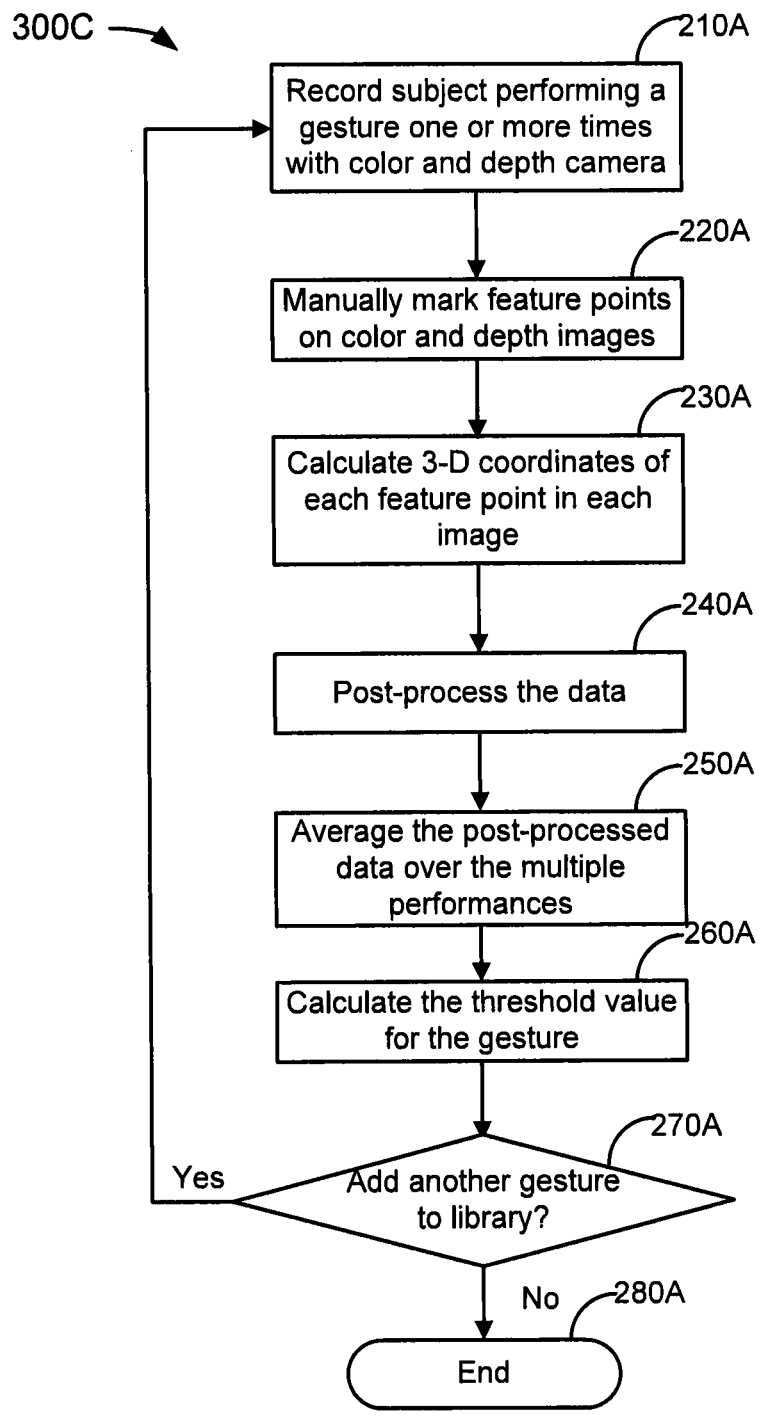
FIG. 3C depicts a flow chart illustrating an exemplary process 300C of creating a library of gestures using color and depth images, according to an embodiment of the disclosure.

FIG. 3C shows an alternative method 300C by which "ground truth" data for a gesture and its corresponding gesture threshold value may be obtained for a gesture library. In step 210A, a videocamera capable of recording color and depth images is used to record at least one subject performing a gesture of interest several times. In step 220A, the positions of the feature points of interest are manually marked on the sequences of color and depth images. In other embodiments, marking the points of interest may be automated or semi-automated. For example, automatic tracking can be run on the depth images from the videocamera to determine points of interest, and in some embodiments the automatically identified points of interest can be corrected manually. In stage 230A, three-dimensional coordinates of each feature point of interest are calculated for each color-depth pair of images in the sequence of images capturing the gesture. Post-processing of the data occurs in step 240A. Post-processing steps that may be performed include smoothing the data temporally and spatially. It will be apparent to a person skilled in the art that other post-processing steps may also be performed.

The data is then averaged in step 250A over the multiple times that the gesture is performed in order to minimize bias. In a preferred embodiment, many different subjects are recorded performing the gesture, and the gestures of the different subjects are averaged to prevent overfitting the ground truth data to one person.

In step 260A, a threshold value is calculated for the gesture such that if a similarity measure comparing the gesture to a person's movements is greater than a threshold value for that particular gesture, it is likely that the person's movements have been identified as that gesture.

Step 270A queries whether another gesture is to be added to the gesture library. If so, the above steps are repeated beginning at step 210A with the recording of at least one subject performing a new gesture. If no further gestures are to be added to the library, then the gesture library is complete.

Any technique used for automatically classifying data can be used, including supervised as well as unsupervised machine learning techniques. Data classification techniques include, but are not limited to, SVM (support vector machines), Hidden Markov Models (HMMs), and k-means clustering. For example, SVM could be used to find the "optimal separation" between two classes of data points ("the desired gesture" and "the not desired gesture"), and the derived decision function could be applied to the candidate gesture to determine which class the candidate gesture falls into.

Figure 4A:
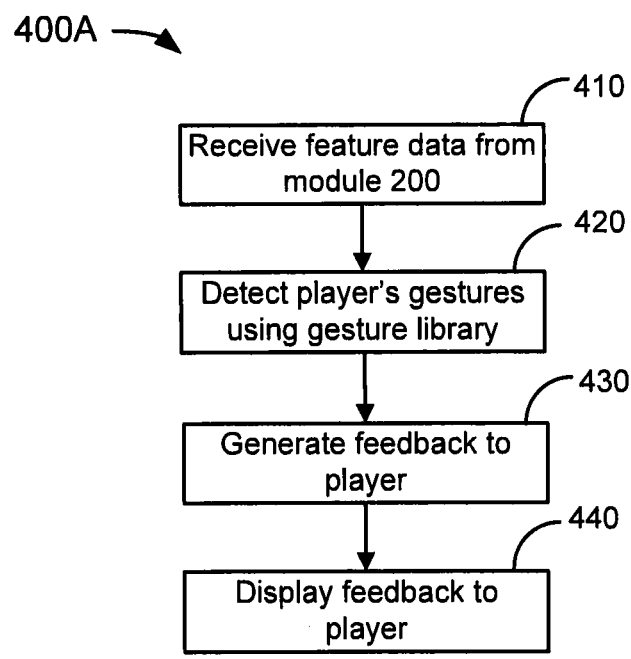
FIG. 4A depicts a flow diagram illustrating an exemplary process 400A for using a binary gesture recognition technique to determine whether the gesture being searched for was performed or not performed, according to an embodiment of the disclosure.

FIG. 4A depicts a flow diagram illustrating an exemplary process 400A for using a binary gesture recognition technique to determine whether the gesture being searched for was performed or not performed, according to an embodiment of the disclosure. In one embodiment, the binary gesture recognition technique can introduce delay in a game by waiting until the full time-dependent sequence is received from the Image Acquisition and Data Pre-Processing Module 200 before computing whether a gesture from the gesture library was performed.

Figure 4B:
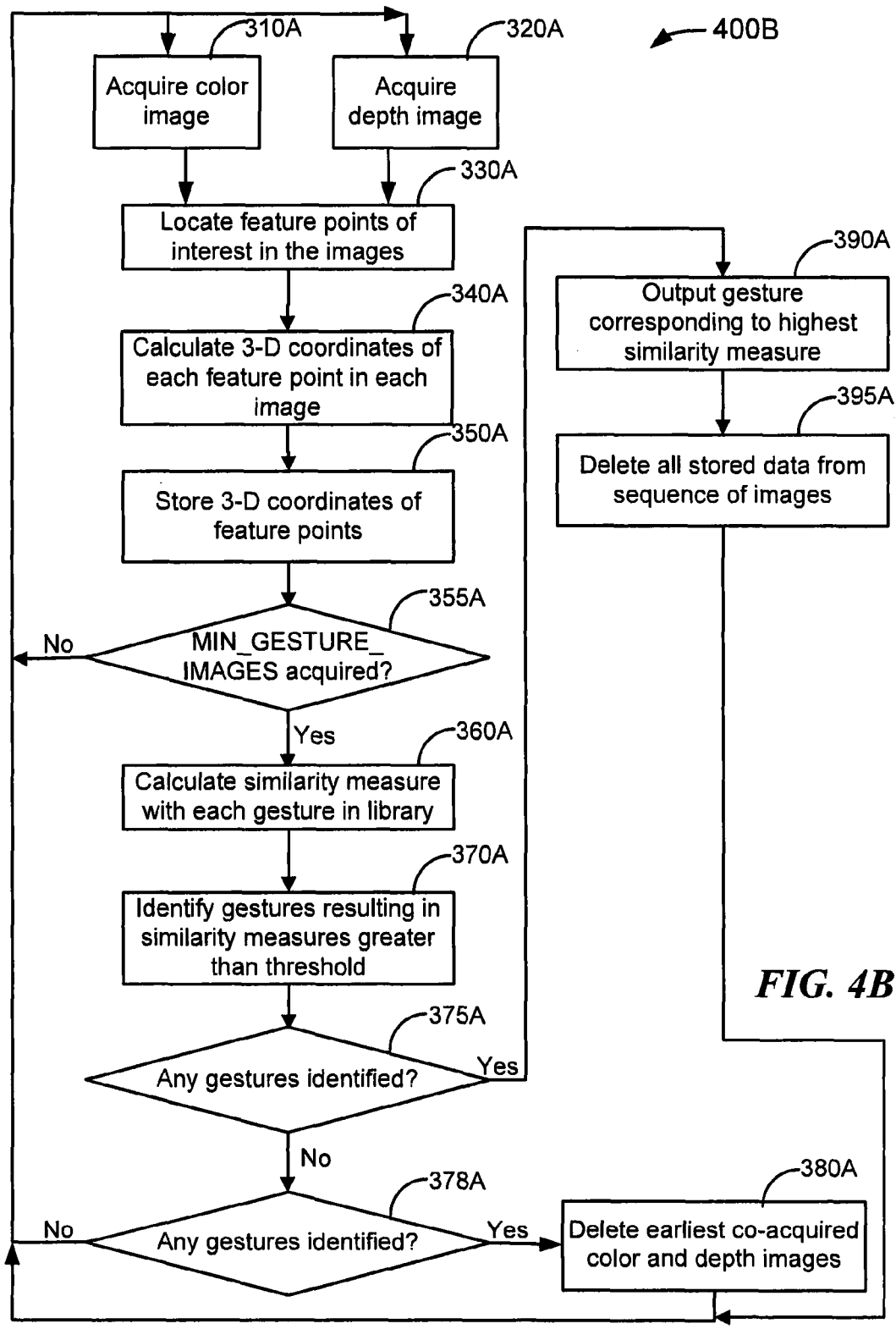
FIG. 4B depicts a flow diagram illustrating an exemplary process 400B for illustrating a method of identifying a gesture from movements captured in a sequence of images, according to an embodiment of the disclosure.

At block 410, the Binary Gesture Recognition Module 400 receives feature data from the Image Acquisition & Pre-processing Module 200 that describe the features. Then at block 420, the player's gestures corresponding to gestures in the gesture library are detected by module 400. The output from block 420 is a detected gesture. In one embodiment, block 420 can contain the blocks of FIG. 3 from U.S. patent application Ser. No. 11/866,280, as shown in FIG. 4B and described below.

The color and depth images acquired in steps 310A and 320A are used to locate feature points of interest on the user's body in step 330A. Feature points of interest may include joints and locations corresponding to, for example, the user's left hand, left elbow, left shoulder, or head. It will be apparent to a person skilled in the art that many other locations on a user's body may also be feature points of interest. The present invention is intended to be able to identify gestures made by any part or parts of a user's body.

In the step 340A, three-dimensional coordinates for each one of the feature points of interest are computed from the color and depth images. The coordinate locations for each of the feature points of interest are stored in step 350A for the frame corresponding to the co-acquired color and depth images.

Classification of a user's recorded movements is accomplished by comparing the movements with each of the gestures stored in a gesture library. Each gesture in the library consists of a sequence of images covering the period of time required to perform the gesture, with a uniform time lapse occurring between images in the sequence. Each gesture is associated with a minimum number of sequential images sufficient to capture the entire movement of the gesture. Thus, a quick gesture like a finger snap requires fewer sequential images, while a gesture that takes a longer time to perform, for example, a handshake, requires more sequential images. Let the gesture in the library which takes the shortest period of time to perform be captured by a number of sequential images called MIN GESTURE IMAGES. Let the gesture in the library which takes the longest period of time to perform be captured by a number of sequential images called MAX GESTURE IMAGES. Thus, capturing MAX GESTURE IMAGES sequential images will be sufficient to capture any gesture in the library.

At decision point 355A, if MIN GESTURE IMAGES sequential images have not been acquired and stored, the process returns to steps 310A and 320A where another set of color and depth images is co-acquired and appended to the sequence of images being analyzed. If at least MIN GESTURE IMAGES sequential images have been stored for analysis, step 360A makes a quantitative comparison of the user's movements with each gesture in the library requiring no more than the number of currently stored images. For example, if gesture A requires eight images to capture, gesture B requires nine images to capture, and gesture C requires ten images to capture, and there are currently nine stored images, a comparison of the eight most recently acquired images will be made with gesture A, while a comparison of all nine images will be made with gesture B. Gesture C will not be used for a comparison at this point in the algorithm because not enough images have been acquired yet.

The quantitative comparison is made through the use of a similarity measure. A similarity measure calculates how similar two gesture data sets are to each other; the higher the similarity measure value is, the more similar the two gesture data sets are. A sample similarity measures is described in more detail below. Thus, in step 360A, a set of similarity measure values are obtained by comparing the user's movements to each gesture in the library requiring no more than the number of currently stored images.

Then in step 370A, each of the similarity measure values in the set are compared to the threshold value for the particular gesture which was used to obtain the similarity measure value. Gestures which result in a similarity measure value greater than the gesture's pre-calculated threshold value, if any, are identified and passed to decision point 375.

At decision point 375A, if at least one gesture has been identified which produced a similarity measure value greater than the corresponding threshold value, the gesture in the library which produced the highest similarity measure value is identified as the gesture that the user made and is output at step 390A. Then in step 395A, the sequence of images acquired in steps 310A and 320A is deleted, and the process subsequently returns to steps 310A and 320A to obtain a new set of color and depth images to identify the next movements made by the user.

At decision point 375A, if no gestures were identified which produced a similarity measure value greater than the corresponding threshold value, then no known gesture was detected in the time period spanned by the sequential images co-acquired in steps 310A and 320A and used to calculate the similarity measure values in step 360A. The process flows to decision point 378A where it is determined whether MAX GESTURE IMAGES sequential images have been acquired. If the number of images that have been stored is less than MAX GESTURE IMAGES sequential images, the process returns to steps 310A and 320A where another set of color and depth images of the user is co-acquired and appended to the sequence of images for analysis.

If at decision point 378A the MAX GESTURE IMAGES sequential images have already been acquired and analyzed, the earliest co-acquired color and depth images in the sequence of images stored for analysis are deleted. Then the process returns to steps 310A and 320A where another set of color and depth images of the user is co-acquired and appended to the sequence of images for analysis.

At block 430, the Game Engine Module of the system generates feedback for the player based on the gestures detected at block 420. The Game Engine Module essentially controls the game application with which the player interacts. At block 440, the system displays the generated feedback on a display for the player, for example, adjusting the player's score according to the player's performance.

Figure 5:
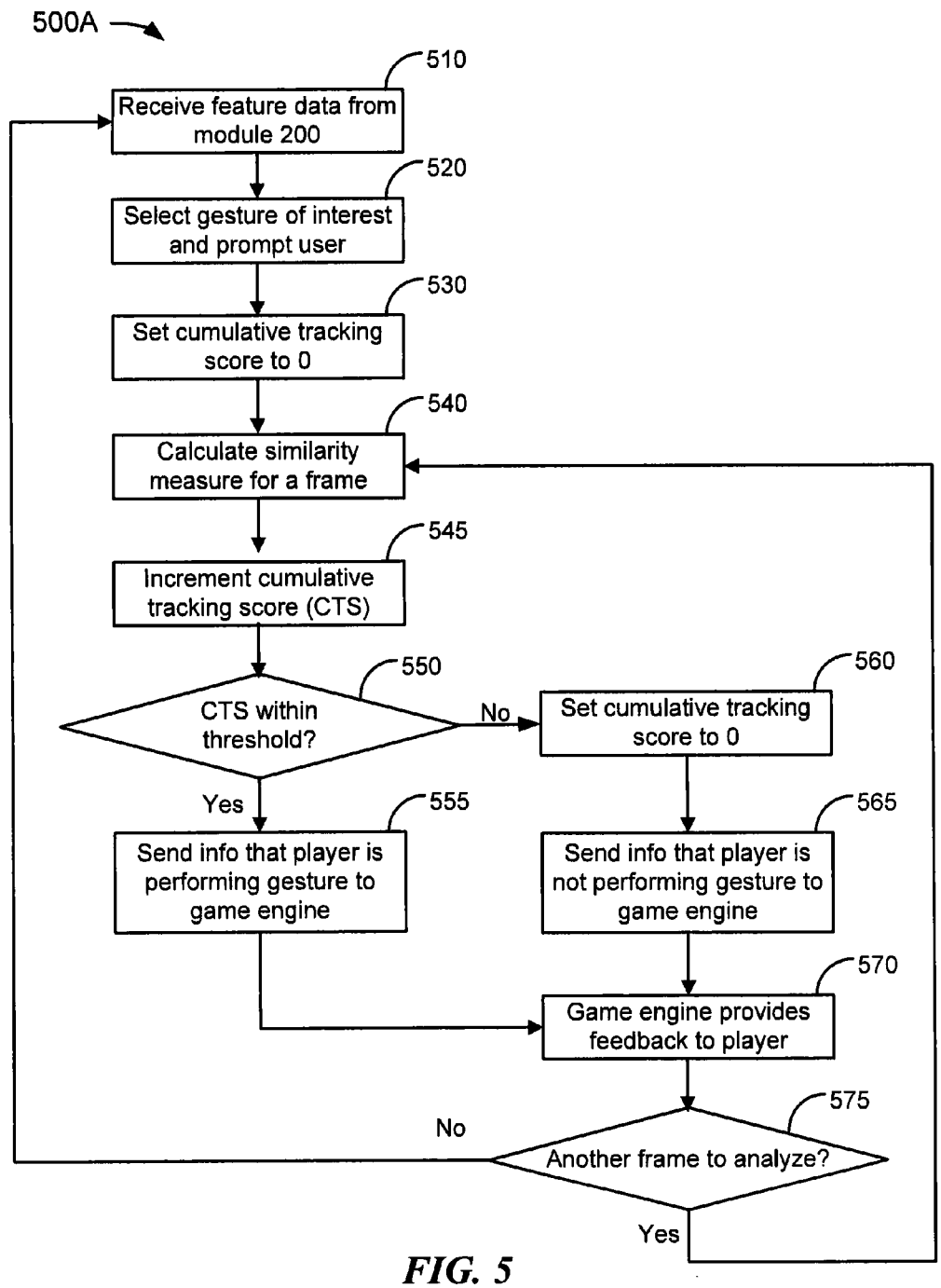
FIG. 5 depicts a flow diagram illustrating an exemplary process 500A of verifying whether the player is performing a particular gesture or not over a period of time (i.e., sequence of frames), and determining how accurately the player is performing the prompted gesture, according to an embodiment of the disclosure.

FIG. 5 depicts a flow diagram illustrating an exemplary process 500A of verifying whether the player is performing a particular gesture or not over a period of time (i.e., over a sequence of frames), and determining how accurately the player is performing the prompted gesture, according to an embodiment of the disclosure.

At block 510, the Real-Time Gesture Recognition Module 500 receives feature data from the Image Acquisition & Pre-processing Module 200. The Real-Time Gesture Recognition Module updates the player's progress in performing the gesture in real-time, for example, after every frame. At block 520, the Game Engine Module of the system selects a gesture of interest and prompts the user to perform the gesture.

At block 530, a cumulative tracking score (CTS) is set to 0. In one embodiment, the CTS is updated at every frame. However, the CTS can be updated at other intervals, for example every second frame. Next, the feature data received at block 510 is compared to the gesture of interest selected at block 520, and a numerical value corresponding to how closely the player's movements match the gesture of interest is computed. One way of comparing the data from block 510 with the gesture of interest data from block 520 is to use a similarity measure.

One exemplary similarity measure is as follows: Consider, for example, x(i,j) is the pre-determined location of joint i at time j, according to the gesture of interest, and y(i,j) is the value obtained from block 510 for joint i at time j, that is, the location of joint i at time j for the gesture of interest. Let w(i) be the weights per joint, and u(j) the weights per time. Then, an example similarity measure is:

$$S_{u,w}(\vec{x}, \vec{y}) = \sum_{j=1}^{n} u(j) \sum_{i=1}^{m} w(i) |x(i, j) - y(i, j)|.$$

In one embodiment, the weights u(j) and w(i) can be assigned on an ad hoc basis. At block 540, the similarity measure (in the above example, $S_{u,w}(x, y)$) is calculated per frame, and at block 545, the cumulative tracking score is incremented by the value of $S_{u,w}(x, y)$.

At decision block 550, the system determines if the cumulative tracking score remains within a given threshold. If the CTS remains within a given threshold (block 550—Yes), this indicates that the movements of the player are sufficiently close to those characterized by the gesture of interest, and the process continues to block 555 where information that the player is performing the gesture of interest is sent to the Game Engine Module. At block 570, the Game Engine Module provides feedback to the player through a display based upon the supplied information.

Then at decision block 575, the system determines if there is another frame to analyze from the feature data received from module 200 at block 510. If there is another frame (block 575—Yes), the process returns to block 540 to calculate a similarity measure for the next frame. If there are no other frames to analyze (block 575—No), the process returns to block 510 to receive more feature data from module 200.

If the CTS does not remain within a given threshold (block 550—No), at block 560, the CTS is set to 0. Then at block 565 the information that the player is not performing the gesture of interest is sent to the Game Engine Module, and the process continues to block 570 as described above.

Figure 6:
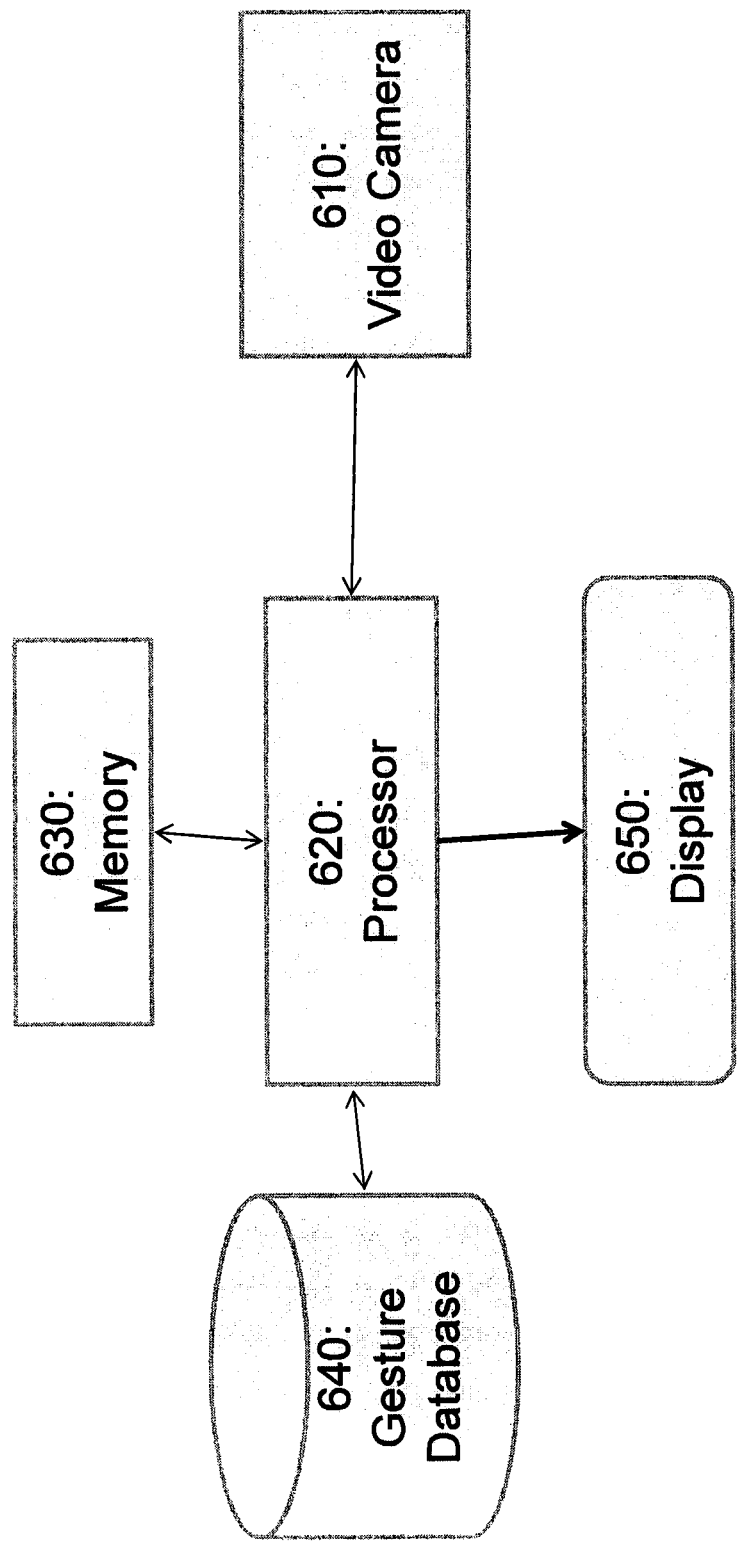
FIG. 6 is a block diagram 600 of one embodiment of the gesture classification system incorporated into an interactive program, according to an embodiment of the disclosure.

FIG. 6 is a block diagram 600 of one embodiment of the gesture classification system incorporated into an interactive program. The video camera equipment 610 captures a user's movements. The video camera equipment 610 takes simultaneous color and depth images of the user, and the images are sent to the processor 620 for processing.

The processor 620 locates feature points of interest in the color and depth images, calculates three-dimensional coordinates for each feature point in the co-acquired color and depth images, stores the coordinates in memory 630 for processing, ensures the minimum number of images have been acquired, calculates similarity measures by comparing the movements with each gesture in the database 640, identifies gestures that have similarity measures greater than the threshold value for the database gesture that the movements have been compared with, identifies the highest similarity measure obtained, prompts the video camera equipment 610 to acquire additional images, controls the memory 630 to delete processed images, and outputs identified gestures to the display 650, thus providing feedback to the user. The processor 620 also runs the interactive program which the user experiences virtually through the display 650.

The display 650 presents an image of the user performing the gesture identified by the processor 620. The image of the user is incorporated into the virtual environment of the interactive program which is also presented by display 650.

Figure 7:
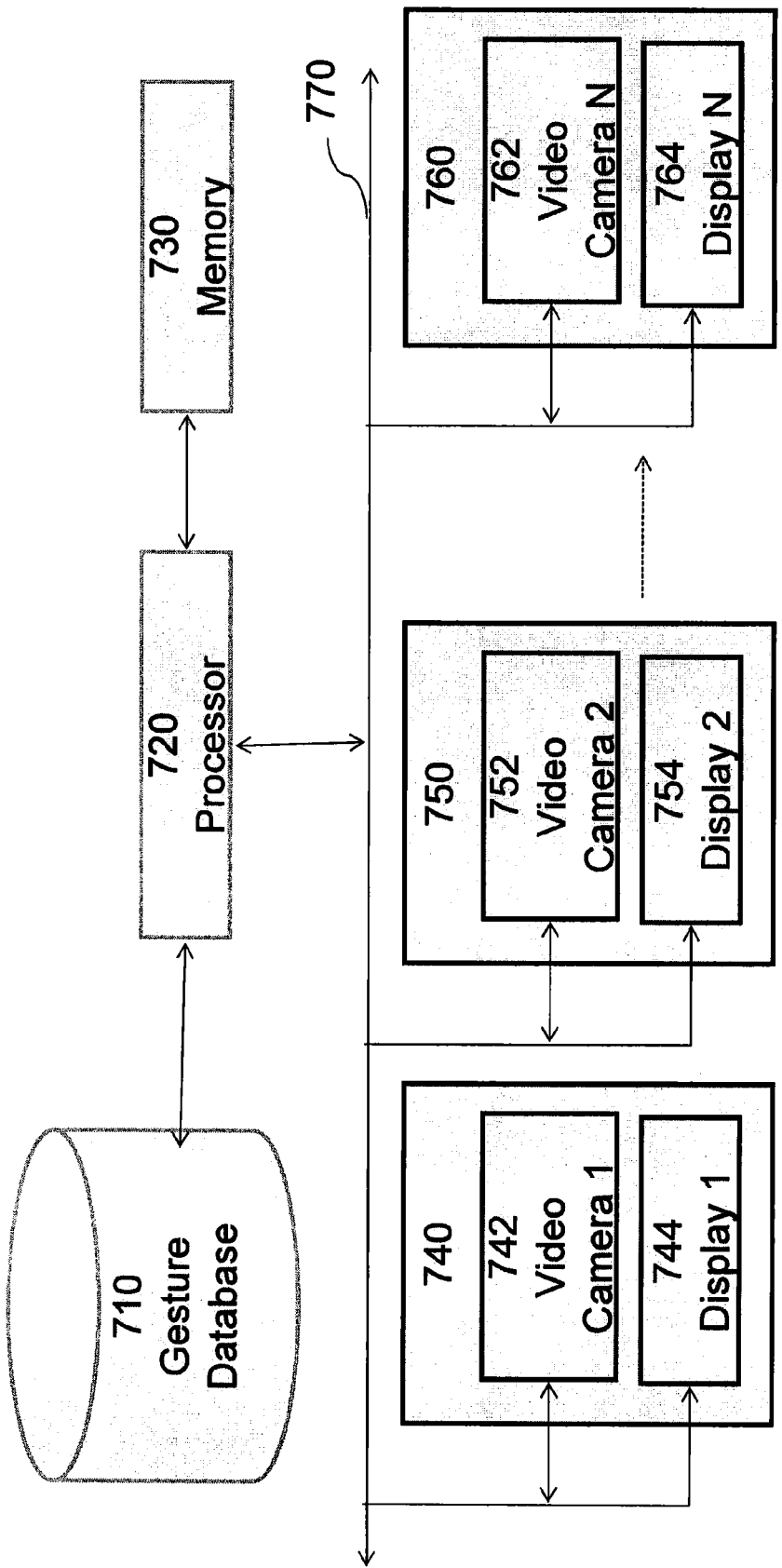
FIG. 7 is a block diagram 700 of one embodiment of the gesture classification system incorporated into an interactive program accessed by multiple players over a network, according to an embodiment of the disclosure.

FIG. 7 is a block diagram 700 of one embodiment of the gesture classification system incorporated into an interactive program accessed by multiple players over a network.

Multiple players may access the same interactive program from different locations. FIG. 7 shows three separate sites 740, 750, and 760 from which users access the same virtual environment, but any number of users from any number of sites may participate in the interactive program. Each site 740, 750, and 760 has video camera equipment 742, 752, and 762 which take simultaneous color and depth images of a user at that location, and the images are sent to the processor 720 for processing. If more than one user is at the same site, video camera equipment dedicated to each user at the site should be available. All the users at the same site may share a display or have their own individual displays 744, 754, and 764. However, all the displays are capable of showing images of all the users at the different sites participating in the same virtual environment.

The images obtained by the video camera equipment 742, 752, and 762 from the different sites 740, 750, and 760 are sent over a network 770 to the processor 720. The processor 720, memory 730, and gesture database 710 function in the same manner as described in FIG. 6 above. However, with multiple users participating in the same interactive program, the processor 720 must process the images captured for each user. Alternatively, the processor 720 may have sub-processors dedicated to individual users, and each sub-processor may access an independent memory within the memory 730. It will be apparent to a person skilled in the art that different hardware structures may implement the functions of the processor 720 and the memory 730 to optimize the response time.

The processor 720 also runs the interactive program which the users experience virtually through the displays 744, 754, and 764. The images of all the users are incorporated into the virtual environment of the interactive program which is presented by each display 744, 754, and 764. Signals are sent by the processor 720 to the displays 744, 754, and 764 along the network 770.

What is claimed is:

1. A method of recognizing a gesture of interest comprising:
    prompting a subject to perform the gesture of interest, wherein a sequence of baseline depth images with three-dimensional baseline positions of feature points are associated with the gesture of interest;
    obtaining from a depth sensor a plurality of depth images of the subject making movements;
    identifying a first set of three-dimensional positions of a plurality of feature points in each of the plurality of depth images;
    projecting the first set of three-dimensional positions of the plurality of feature points onto a constrained three-dimensional model for each of the plurality of depth images;
    mapping the first set of three-dimensional positions of the plurality of features using the constrained model for each of the plurality of depth images independently of the other plurality of depth images;
    determining whether the mapped first set of three-dimensional positions of the feature points are quantitatively similar to the three-dimensional baseline positions of feature points in the one or more baseline depth images of a pre-determined gesture;
    independently comparing the mapped first set of three-dimensional positions of the plurality of feature points for each of the plurality of depth images to the three-dimensional baseline positions of feature points in the sequence of baseline depth images for the gesture of interest as each of the plurality of depth images is obtained;
    determining a tracking score based on the comparing; and
    determining that the subject is performing the gesture of interest if the tracking score remains within a given threshold.

2. The method of claim 1, further comprising selecting the gesture of interest from a gesture library.

3. The method of claim 1, wherein the comparing includes computing a similarity measure.

4. The method of claim 1, wherein the depth sensor comprises a depth camera.

5. The method of claim 1, wherein the constrained model comprises an inverse kinematics solver.

6. The method of claim 1, further comprising animation retargeting for scaling the constrained model onto a standard model.

7. A system for recognizing gestures, comprising:
    a depth sensor for acquiring multiple frames of image depth data;
    an image acquisition module configured to receive the multiple frames of image depth data from the depth sensor and process the multiple frames of image depth data wherein processing comprises:
        identifying three dimensional positions of feature points in each of the multiple frames of image depth data;
        projecting the three dimensional positions of feature points onto a constrained three-dimensional model for each of the multiple frames of image depth data;
        mapping the three-dimensional positions of the feature points using the constrained model for each of the multiple frames of image depth data independently of the other multiple frames;
    a library of pre-determined gestures, wherein each pre-determined gesture is associated with one or more baseline depth images having three-dimensional baseline positions of feature points;
    a binary gesture recognition module configured to receive the mapped three-dimensional positions of the feature points of the subject from the image acquisition module and determine whether the mapped three-dimensional positions of the feature points are quantitatively similar to the three-dimensional baseline positions of feature points in the one or more baseline depth images of a pre-determined gesture in the library;
    a real-time gesture recognition module configured to receive the mapped three-dimensional positions of the feature points of the subject from the image acquisition module, compare the mapped three-dimensional positions of the feature points for each of the multiple frames of image depth data to the three-dimensional baseline positions of feature points in the one or more baseline depth images associated with a prompted gesture of interest as each of the plurality of depth images is obtained to determine a tracking score and determine that the subject is performing the gesture of interest if the tracking score remains within a given threshold.

8. The system of claim 7, further comprising:
    a game engine module configured to select the prompted gesture and prompt the subject to perform the prompted gesture.

9. The system of claim 7, further comprising:
    a display for providing feedback to the subject about gestures performed by the subject.

10. The system of claim 7 wherein the camera further acquires color image data.

11. The system of claim 7 wherein the real-time gesture recognition module is further configured to calculate a similarity measure and a cumulative tracking score, wherein the similarity measure and the cumulative tracking score are updated for each frame independently of the other frames, and further wherein the determination whether the particular gesture is being performed is based upon comparing the cumulative tracking score to a threshold for the particular gesture for each frame.

12. The system of claim 7 wherein the constrained model comprises an inverse kinematic solver.

13. The system of claim 7 wherein the image acquisition module scales the feature positions to a standard model.

14. The system of claim 7 wherein the gesture training module uses machine learning techniques to determine whether the feature positions match a particular gesture.

* * * * *